(12) United States Patent
Kapsenberg et al.

(10) Patent No.: US 12,372,627 B2
(45) Date of Patent: Jul. 29, 2025

(54) TWO-STEP RETURN CALIBRATION FOR LIDAR CROSS-TALK MITIGATION

(71) Applicant: Waymo LLC, Mountain View, CA (US)

(72) Inventors: Pieter Kapsenberg, Santa Clara, CA (US); Georges Goetz, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 894 days.

(21) Appl. No.: 17/644,994

(22) Filed: Dec. 17, 2021

(65) Prior Publication Data

US 2023/0194676 A1 Jun. 22, 2023

(51) Int. Cl.
*H04B 10/69* (2013.01)
*G01S 7/4861* (2020.01)
*G01S 7/4865* (2020.01)
*G01S 17/931* (2020.01)

(52) U.S. Cl.
CPC .......... *G01S 7/4861* (2013.01); *G01S 7/4865* (2013.01); *G01S 17/931* (2020.01); *H04B 10/697* (2013.01)

(58) Field of Classification Search
CPC .......................................... H04B 10/69–6973
See application file for complete search history.

(56) References Cited

U.S. PATENT DOCUMENTS 9,178,622 B2 11/2015 Ruiz et al.
10,317,529 B2 6/2019 Shu et al.
10,969,651 B2 4/2021 Seliuchenko et al.
10,983,197 B1 4/2021 Zhu et al.
11,131,755 B2 9/2021 Retterath et al.
(Continued)

FOREIGN PATENT DOCUMENTS

WO WO-2021034798 A1 * 2/2021 ............. G01S 17/10

OTHER PUBLICATIONS

Sheng Lu, Xiao-Li Cao, Zhong-Jian Cai, Gao-Rong Zeng and Tan Liu, "An embedded CPU based automatic ranging system for vehicles," 2007 Mediterranean Conference on Control & Automation, Athens, Greece, 2007, pp. 1-5, doi: 10.1109/MED 2007. 4433700. (Year: 2007).*

(Continued)

*Primary Examiner* — Nathan M Cors
(74) *Attorney, Agent, or Firm* — McDonnell Boehnen Hulbert & Berghoff LLP

(57) ABSTRACT

An optical receiver includes a plurality of photodetectors, a shared memory, and a pulse calibration processing unit communicatively coupled to the shared memory. The optical receiver also includes a hardware accelerator module configured to accept input waveforms from the plurality of photodetectors and compare an amplitude of the respective input waveforms with a predetermined threshold. Based on the comparison, the hardware accelerator module could determine subsets of the input waveforms and determine information indicative of characteristic aspects of the subsets of the input waveforms. The optical receiver is additionally operable to store the determined information in the shared memory and trigger an interrupt for the pulse calibration processing unit to initiate a pulse calibration process on the determined information.

20 Claims, 12 Drawing Sheets

(56) References Cited

U.S. PATENT DOCUMENTS

| | | |
|---|---|---|
| 11,156,717 B2 | 10/2021 | Lingg et al. |
| 2018/0196125 A1 | 7/2018 | Irish |
| 2020/0041622 A1 | 2/2020 | Juelsgaard |
| 2020/0064452 A1* | 2/2020 | Avlas ............... G01S 7/4804 |
| 2020/0284887 A1* | 9/2020 | Wachter ............ G01S 13/867 |
| 2021/0033711 A1* | 2/2021 | Helsloot ............ G01S 7/4817 |
| 2021/0349185 A1* | 11/2021 | Schleuning ........ G01S 7/4818 |
| 2023/0051395 A1* | 2/2023 | Wilton .............. G01S 7/484 |

OTHER PUBLICATIONS

Martins et al., "Impact of Interference on Time-Of-Flight LiDAR," Proceedings of RECPAD 2019, 25th Protuguese Conference on Pattern Recognition, 2019, 2 pages.

\* cited by examiner

TWO-STEP RETURN CALIBRATION FOR LIDAR CROSS-TALK MITIGATION

BACKGROUND

Autonomous vehicles, semi-autonomous vehicles, vehicles operating in an autonomous mode, and/or vehicles operating in a semi-autonomous mode may use various sensors to detect their surroundings. For example, light detection and ranging (lidar) devices, radio detection and ranging (radar) devices, and/or cameras may be used to identify objects in environments surrounding autonomous or semi-autonomous vehicles. Such sensors may be used in object detection and avoidance and/or in navigation, for example.

One of the challenges associated with producing high quality lidar point cloud data for object detection and classification is the presence of high reflectivity objects (retroreflectors and specular reflectors when viewed at certain angles) in various driving scenarios. Returns from these objects can cause significant cross-talk between neighboring channels of the detector when multiple channels are active at the same time. The higher the number of channels and their density, and the longer the duration that the lidar listens to returns for, the worse the problem becomes.

At the same time, increasing channel density and listening time is beneficial to support challenging driving situations (for example, to guarantee sufficiently many lidar return points are captured from cars stranded on the side of the freeway at 350+ meters for trucking applications). This makes it challenging to deal with retroreflectors. A possible mitigation strategy involves inspecting lidar returns as they are produced by the system, detect with a classification algorithm when these returns come from an abnormally bright object, and change the emission pattern on the channels on which such returns are detected to actively mitigate the impact they have on the lidar point cloud.

As lidar data rates increase, it becomes increasingly difficult to make the decision of whether to turn on active mitigation for bright returns before the amount of cross-talk generated in the point cloud exceeds what a machine learning algorithm can handle. This problem is made even more challenging by the sophisticated calibration algorithms applied to each return produced by the lidar in order to compensate for systematic artifacts in a raw point cloud.

SUMMARY

This disclosure relates to a two-step, hardware-accelerated process by which a lidar system may rapidly decide to take action when it encounters bright objects, while simultaneously remaining capable of producing high-quality point cloud data.

In a first aspect, an optical receiver is provided. The optical receiver includes a plurality of photodetectors and a shared memory. The optical receiver also includes a pulse calibration processing unit communicatively coupled to the shared memory. The optical receiver additionally includes a hardware accelerator module configured to, during an initial phase, accept input waveforms from the plurality of photodetectors, compare an amplitude of the respective input waveforms with a predetermined threshold, and based on the comparison, determine subsets of the input waveforms. The hardware accelerator module is also configured to, during a subsequent phase, determine information indicative of characteristic aspects of the subsets of the input waveforms, store the determined information in the shared memory, and trigger an interrupt for the pulse calibration processing unit to initiate a pulse calibration process on the determined information.

In a second aspect, a method is provided. The method includes, during an initial phase, receiving, at a hardware accelerator module, input waveforms from a plurality of photodetectors. The method also includes, during the initial phase, comparing an amplitude of the respective input waveforms with a predetermined threshold, and, based on the comparison, determining subsets of the input waveforms. The method additionally includes, during a subsequent phase, determining information indicative of characteristic aspects of the subsets of the input waveforms. The method also includes, during the subsequent phase, storing the determined information in a shared memory, and triggering an interrupt for a pulse calibration processing unit to initiate a pulse calibration process on the determined information.

In a third aspect, a non-transitory computer-readable medium having encoded thereon instructions executable to carry out operations is provided. The operations include, during an initial phase, receiving, at a hardware accelerator module, input waveforms from a plurality of photodetectors. The operations also include, during the initial phase, comparing an amplitude of the respective input waveforms with a predetermined threshold and based on the comparison, determining subsets of the input waveforms. The operations additionally include, during a subsequent phase, determining information indicative of characteristic aspects of the subsets of the input waveforms. The operations yet further include, during the subsequent phase, storing the determined information in a shared memory, and triggering an interrupt for a pulse calibration processing unit to initiate a pulse calibration process on the determined information.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
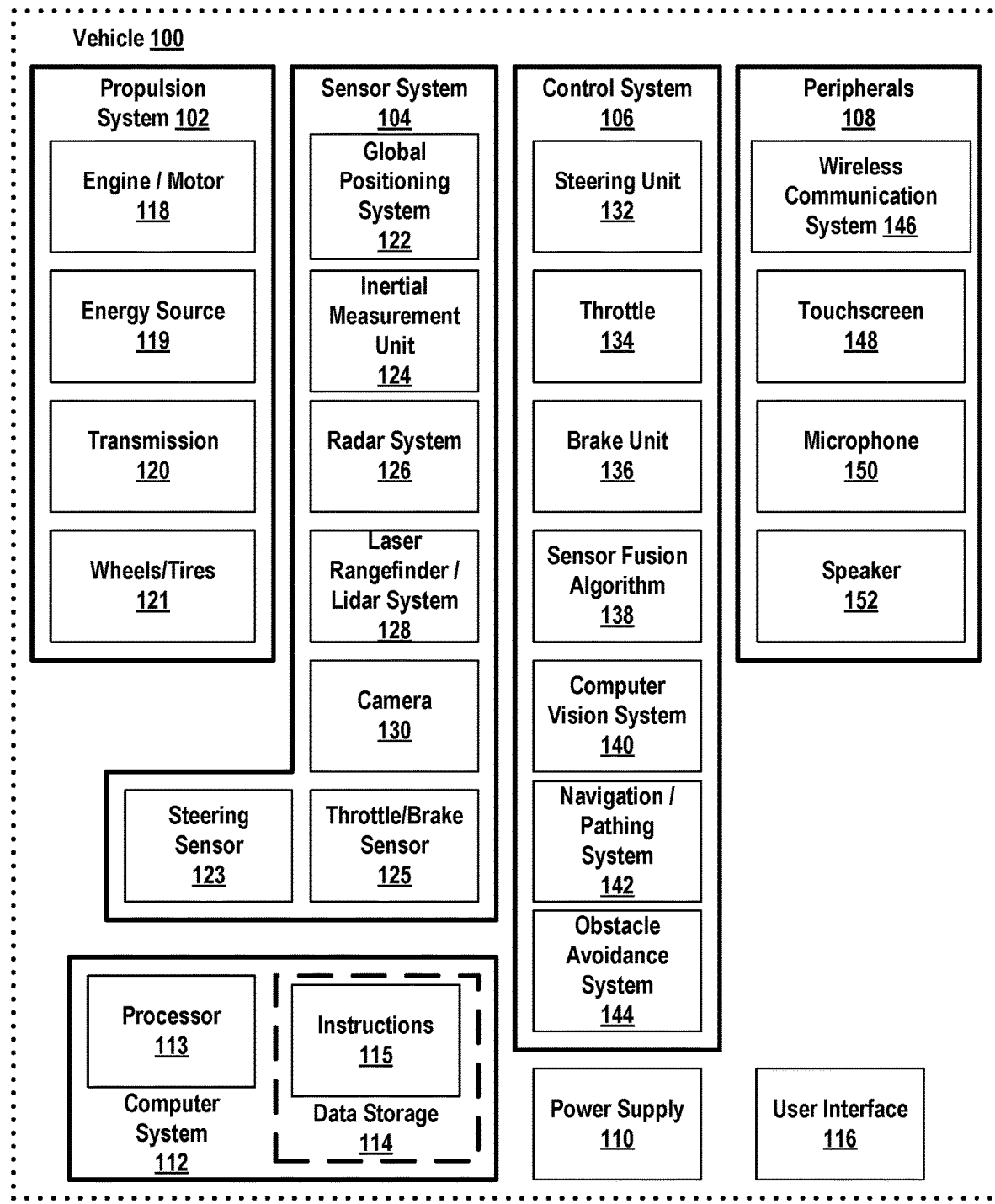
FIG. 1 is a functional block diagram illustrating a vehicle, according to example embodiments.
Figure 2A:
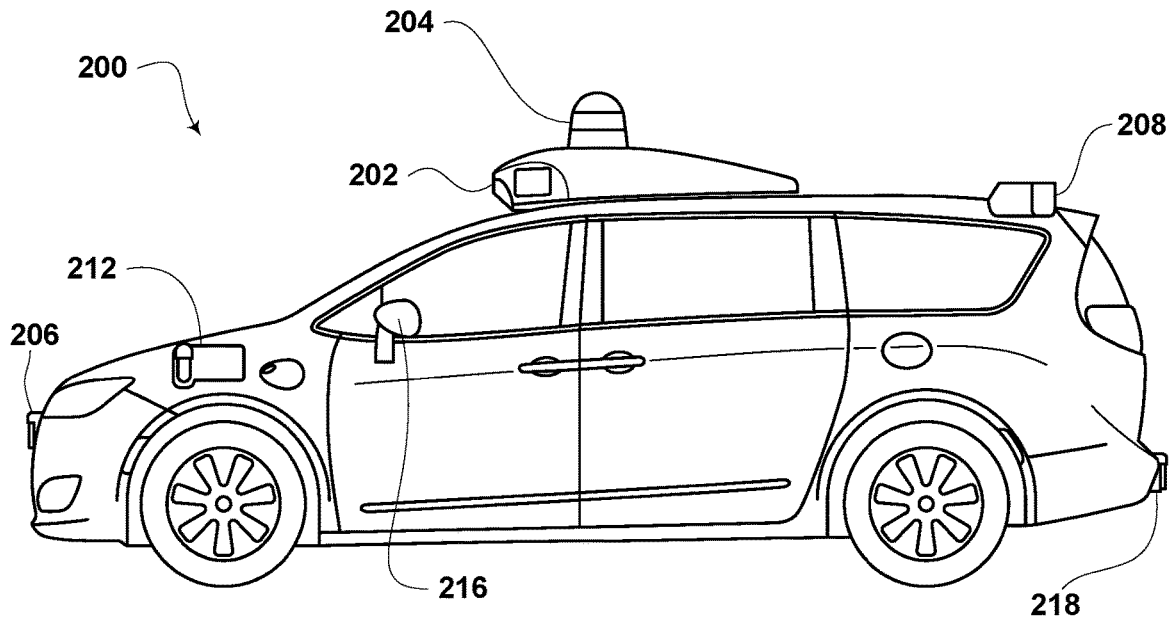
FIG. 2A is an illustration of a physical configuration of a vehicle, according to example embodiments.
Figure 2B:
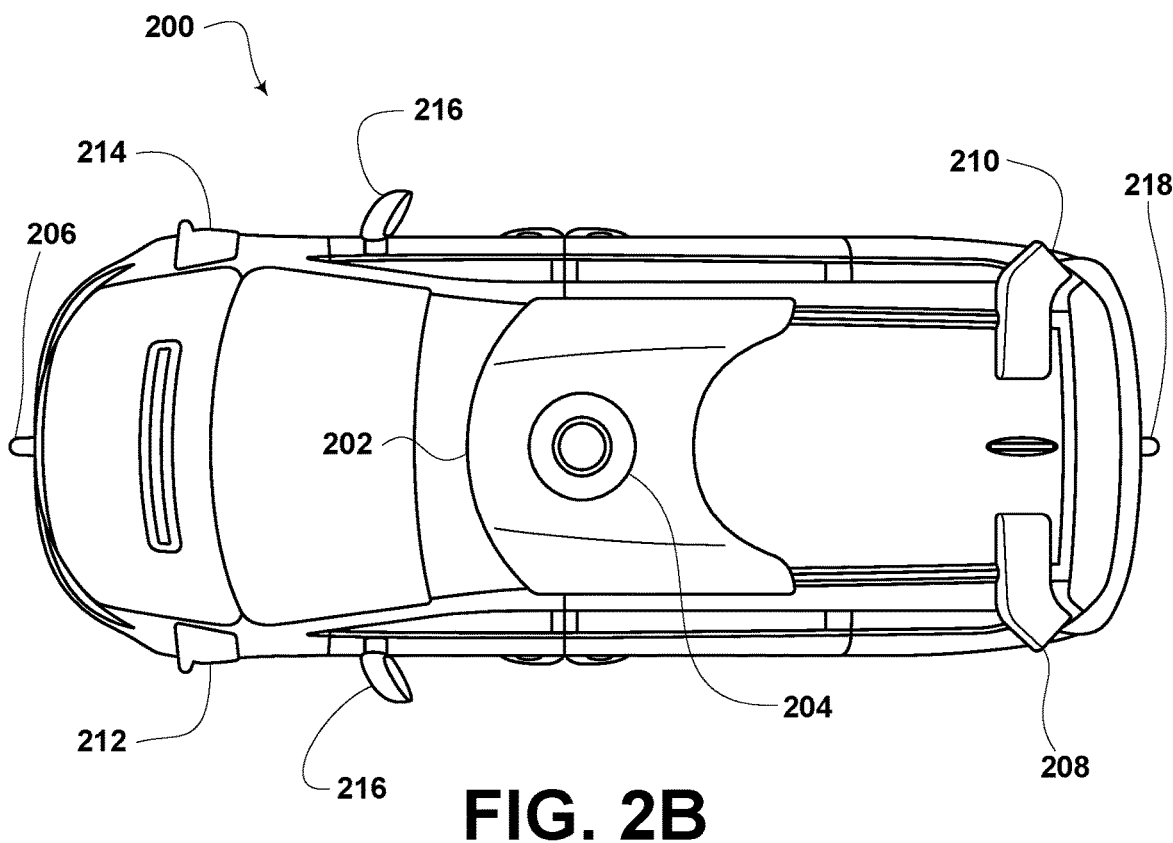
FIG. 2B is an illustration of a physical configuration of a vehicle, according to example embodiments.
Figure 2C:
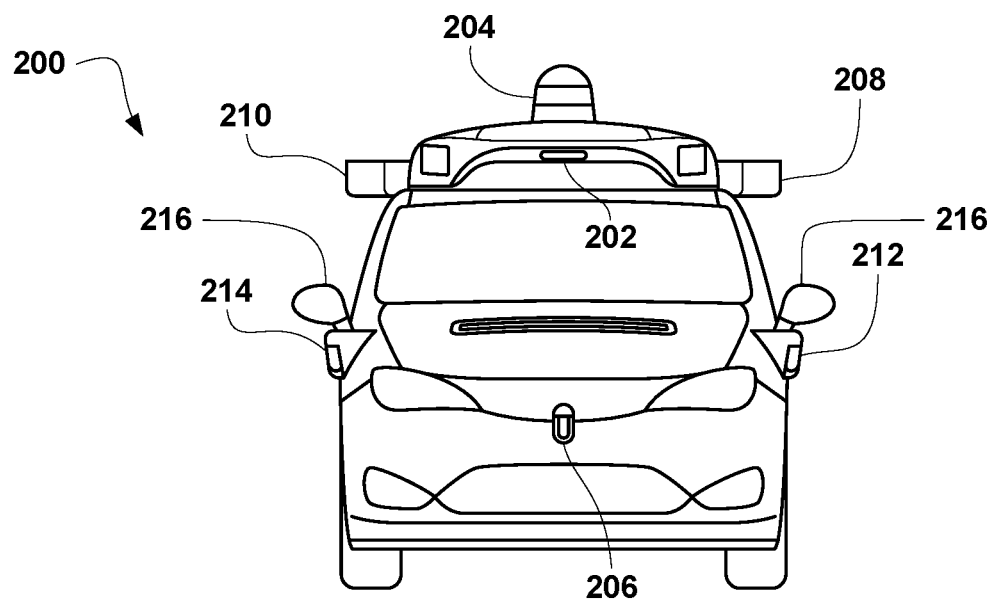
FIG. 2C is an illustration of a physical configuration of a vehicle, according to example embodiments.
Figure 2D:
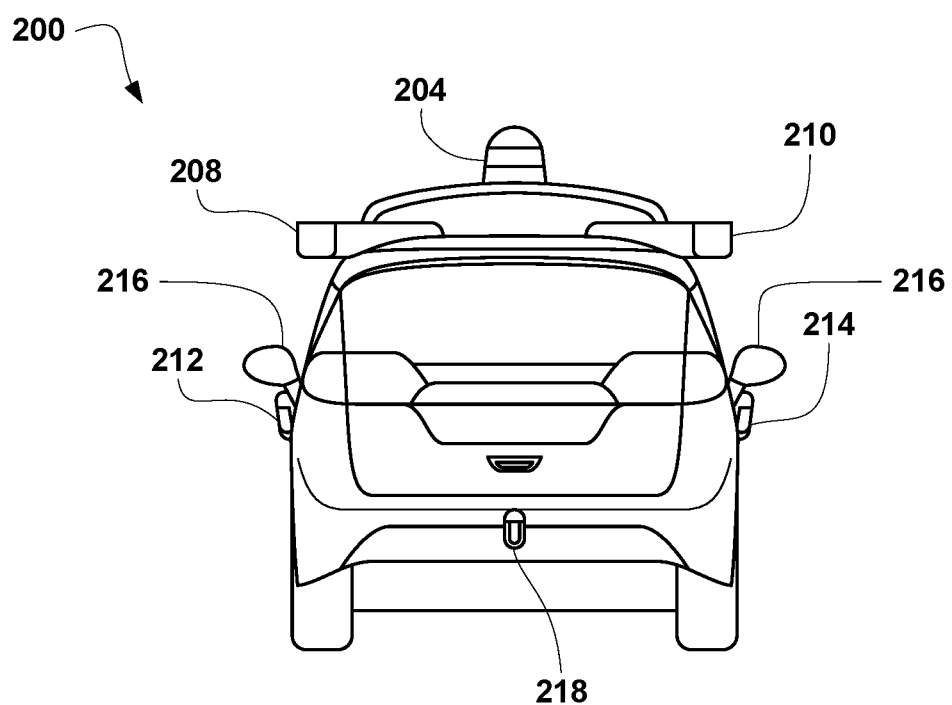
FIG. 2D is an illustration of a physical configuration of a vehicle, according to example embodiments.
Figure 2E:
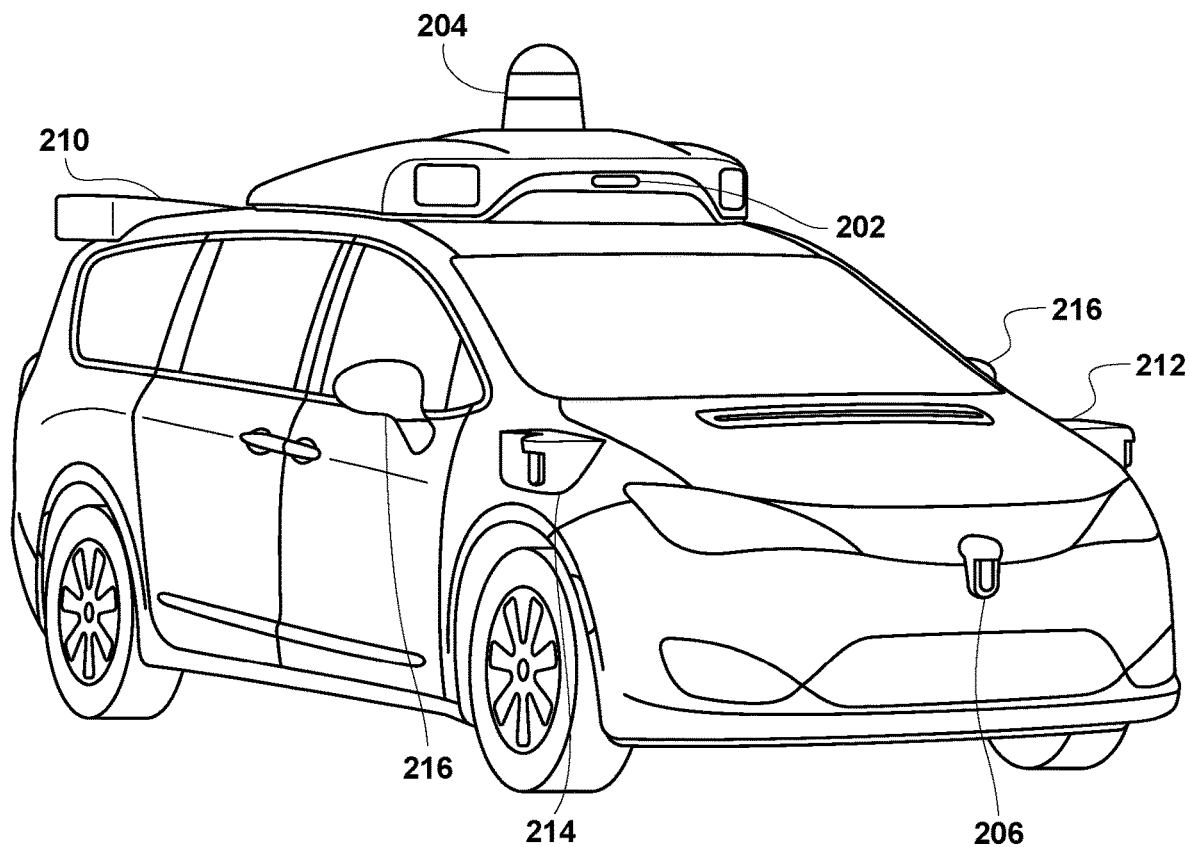
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, terrain, etc. Additionally, the one or more light emitters could emit light into a local environment of the lidar system itself. For example, light emitted from the one or more light emitters could interact with a housing of the lidar system and/or surfaces or structures coupled to the lidar system. In some cases, the lidar system could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

The present disclosure describes a two-step, hardware accelerated process by which a lidar system may rapidly decide to take action when it encounters bright objects, while simultaneously remaining capable of producing high-quality point cloud data. An example embodiment of a lidar system could include a plurality of lidar channels. Each lidar channel could include a laser for generating emission light, a transmit (TX) path along which the emission light could propagate, a receive (RX) path along which return light could be received, a photodetector configured to detect the return light, an analog-to-digital converter (ADC), and a coprocessor (e.g., a central processing unit (CPU)) configured to analyze return light pulses. Other types of coprocessors are possible and contemplated. For example, the coprocessor could be implemented using one or more microcontrollers, one or more graphical processing units (GPUs), one or more tensor processing units (TPUs), one or more application-specific integrated circuits (ASICs), and/or one or more field-programmable gate arrays (FPGAs). An example system could include n optical channels, which could be implemented as n photodetectors that are coupled to n hardware accelerators, which are then coupled to n "channel CPUs", where n is an integer value. The plurality of the optical channels could be coupled to one or more "hub CPUs". In example embodiments, data from the photodetector are initially processed by a hardware accelerator, which performs a "coarse" initial processing step by first (1) locating in a full photodetector waveform the segments of interest, typically those that cross a specified threshold. Then (2), for the subsets of the waveform that cross the detection threshold, the hardware accelerator extracts specific statistics of interest, such as pulse integral, pulse width, maximum amplitude, and the number and location of the extrema (e.g., waveform maximum and/or waveform minimum). Finally (3), the hardware accelerator directly sends the statistics for the detected pulses to a shared memory location, available to both the hardware accelerator, a CPU in charge of precisely calibrating the pulses, and another CPU in charge of planning the shot sequence. In various examples, the hardware accelerator could be configured to use a direct memory access (DMA) process to send to and/or receive data from the shared memory location. In some embodiments, "calibrating the pulses" could include a process by which systematic measurement errors of range, width, and/or intensity measurement are corrected and/or mitigated. Upon completion of this sequence, the hardware accelerator triggers an interrupt for the CPU responsible for calibrating a respective pulse, which is thus notified that it needs to inspect pulse data. There is one hardware accelerator and one channel CPU per lidar channel, and one CPU in charge of planning the shot sequence per ASIC. The shot planning CPU could be termed the hub CPU.

The interrupt triggered by the hardware accelerator causes the CPU responsible to calibrate returns to immediately iterate over the pulse statistics published by the hardware accelerator, and send each of them through a binary classifier which outputs a "yes" if a return is deemed excessively bright, and "no" otherwise. If for any of the pulses returned by the processor, the classifier output is yes, then the channel CPU writes a flag indicating so at a predetermined location in shared memory, accessible by the hub CPU.

In one example, the pulse brightness classifier used by an example lidar system could classify a portion of the waveform as a pulse if the pulse integral divided by the pulse width is greater than a threshold value, $k_{Threshold}$. The pulse classification step is on the critical timing path for making a decision as to whether to turn on active crosstalk mitigation. As such, the analysis may be performed inside an interrupt service routine (ISR) attached to the interrupt channel on which the hardware accelerator notifies the channel CPU it has completed its work.

Subsequently, at a predetermined time relative to an emission time of the emitted light pulse, the hub CPU fetches from shared memory the boolean indicator emitted by each channel CPU it is responsible for, and kicks off the crosstalk mitigation sequence on each channel for which it is needed. In its simplest form, this mitigation consists of turning off the lasers on subsequent shots, until for example a fixed amount of time has elapsed, or until another indicator (e.g., a lack of dim return caused by Tx crosstalk, etc.) is used to turn the lasers back on. Alternatively, the channels could also push the result of the classification step to the hub CPU.

For the hub CPU to be able to fetch the result in time, the following conditions should be met: (1) classification of the returns should finish in a deterministic time following the emission of a shot (or with low jitter), (2) the hub and channel CPU should agree on the location at which the output of the classifier is written, and (3) the hub and channel CPU should share the same notion of time. Condition (1) is met because a hardware accelerator detects the returns (processes in data deterministic time) and the channel CPU immediately classifies the resulting pulses in an ISR, which guarantees completion in a fixed amount of time. Condition (2) can be met by ensuring that the data arrives at a known address in memory (e.g., using a linker script, etc.). Finally, condition (3) is achieved in the example embodiments by running the hub and channel CPUs off the same clock.

After the channel CPU classifies whether a return was excessively bright or not, it sorts the returns published by the hardware accelerator in order of priority (for example, by prioritizing the returns with higher integral, possibly with a range-dependent weight), and selects up to m returns for subsequent calibration (in an example lidar, m=3). In some examples, the number of m returns selected may vary depending on various factors such as the brightness of the scene, presence of retroreflectors, and/or other criteria. Return calibration involves applying more advanced processing algorithms to the return waveform (e.g., using a channel-specific calibration) so as to obtain an unbiased estimate of range, intensity and pulse elongation. It is a computationally expensive process, hence it is important to perform it on as few returns as possible. The m returns selected are published to downstream consumers following calibration.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks, motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the laser rangefinder/lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor, an application-specific integrated circuit (ASIC), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speed-bumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114.

In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or laser rangefinder/lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors 216 for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more range finders, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar system could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, range finders, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.). For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e., pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
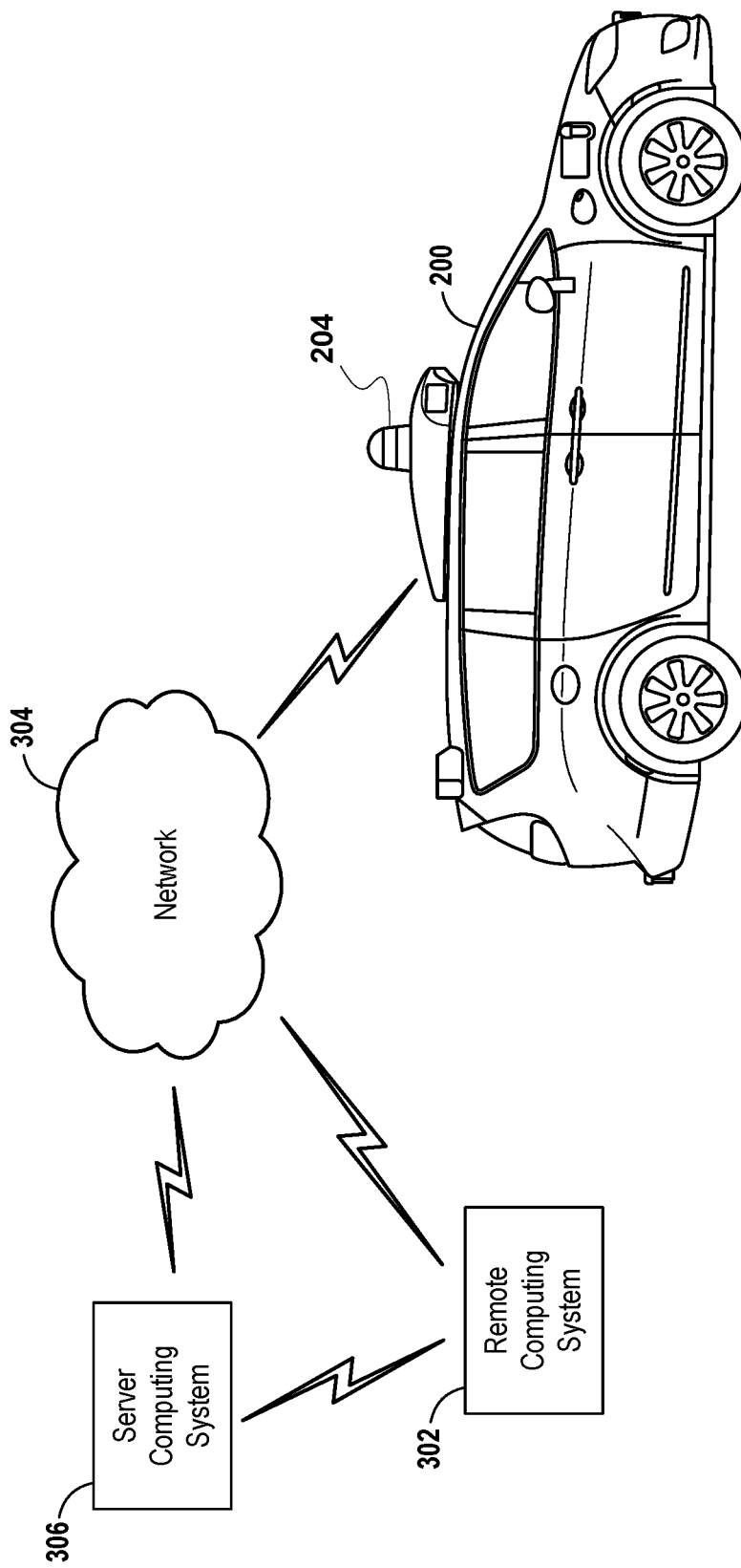
FIG. 3 is a conceptual illustration of wireless communication between various computing systems related to an autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar unit, a laser rangefinder/lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laserrangnge finder/lidar may be configured to transmit an electromagnetic signal (e.g., infrared light, such as that from a gas or diode laser, or other possible light source) that will be reflected by target objects near the vehicle. The laser rangefinder/lidar may be able to capture the reflected electromagnetic (e.g., infrared light, etc.) signals. The captured reflected electromagnetic signals may enable the range-finding system (or processing system) to determine a range to various objects. The laser rangefinder/lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4A:
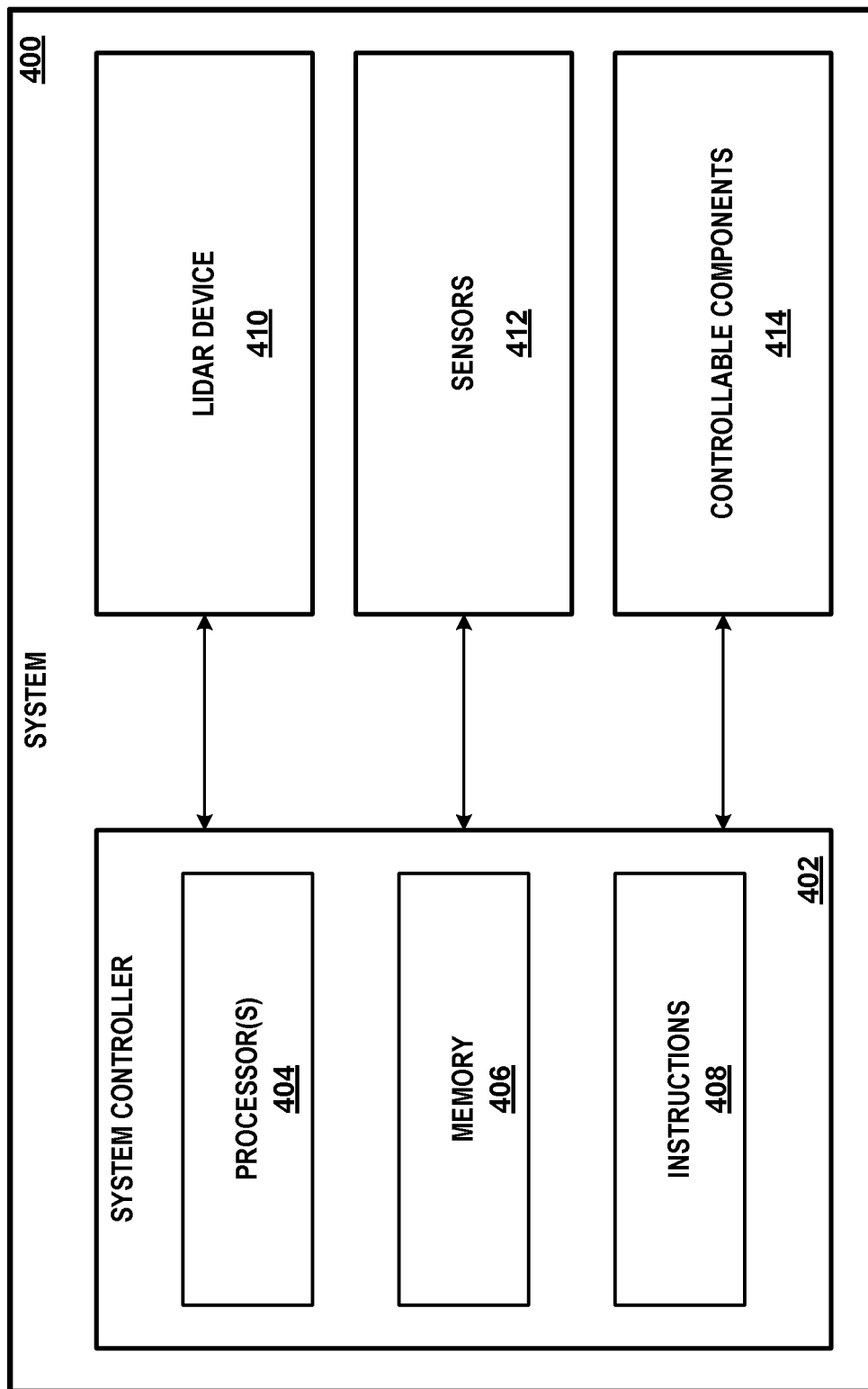
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores, etc.) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory, etc.), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses, etc.) and one or more light detectors configured to detect light (e.g., reflected portions of the light pulses, etc.). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, proximity sensing, etc.).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera, etc.), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode, etc.). Within examples, the lidar device 410 and the sensors 412 are also controllable by the system controller 402.

Figure 4B:
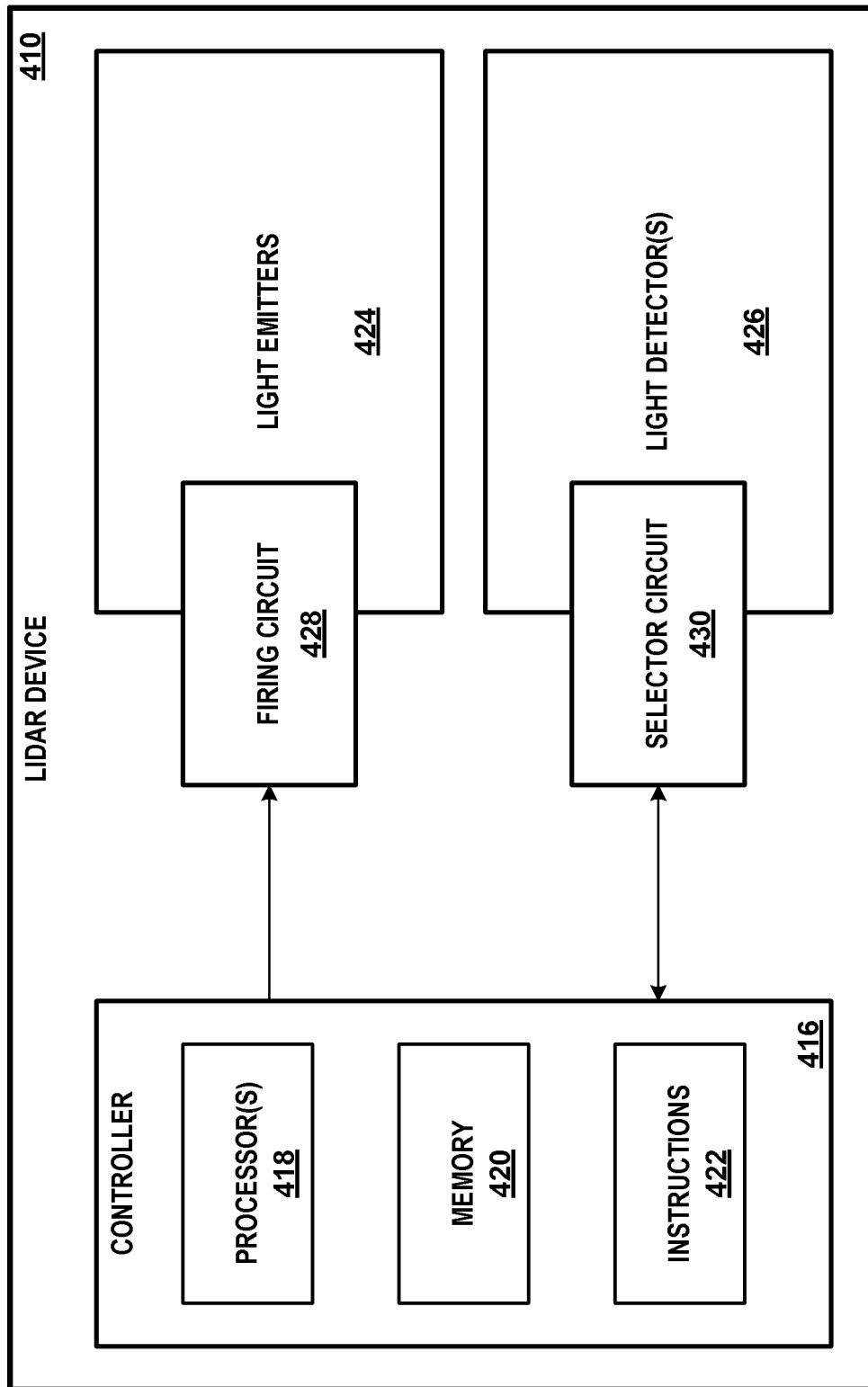
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory, etc.), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, etc. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system, etc.) and intensities of each reflected light pulse.

The firing circuit 428 is used for selecting light emitters for emitting light pulses. The selector circuit 430 similarly is used for sampling outputs from light detectors.

Figure 5:
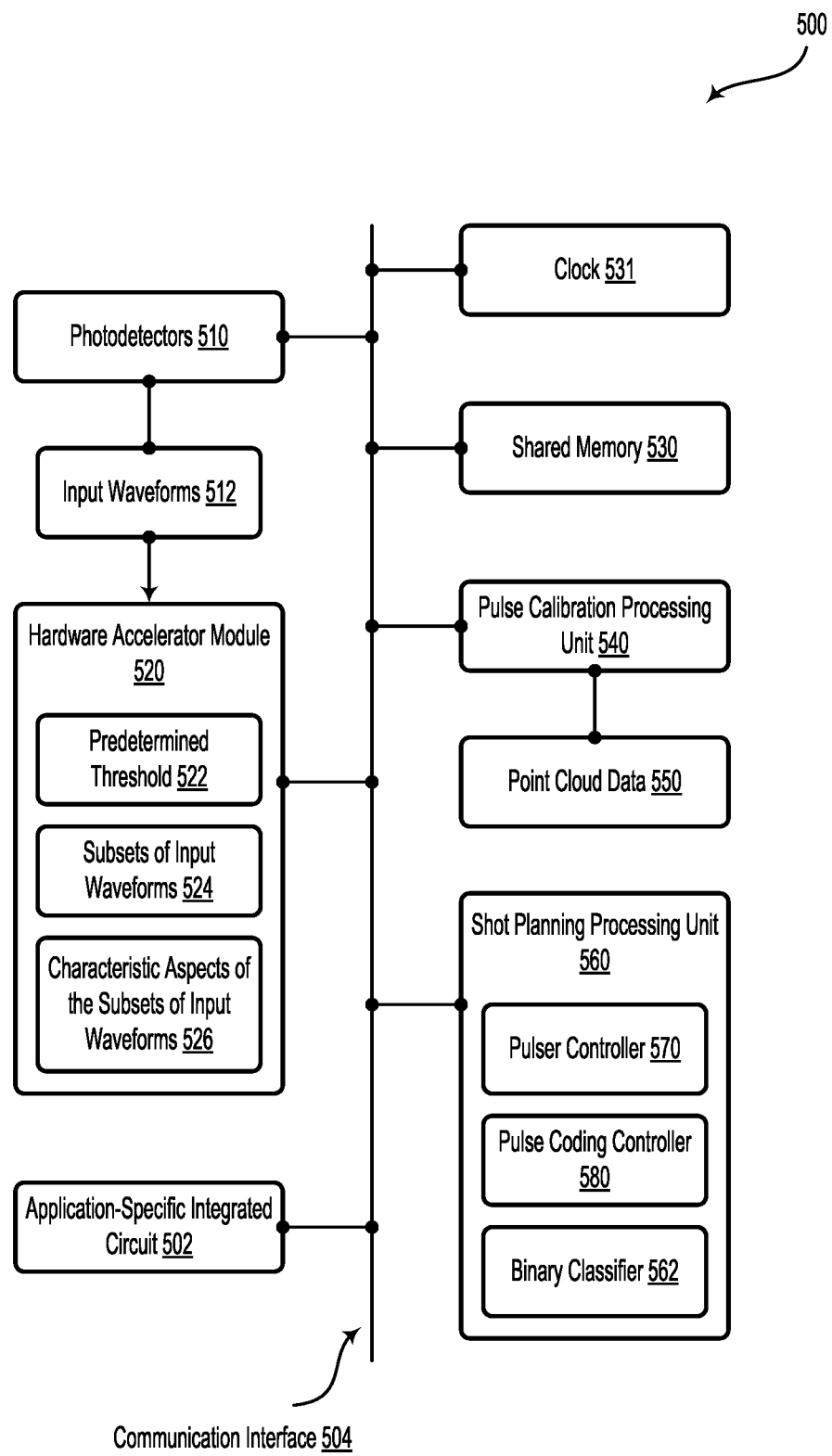
FIG. 5 is a block diagram of an optical receiver, according to example embodiments.
Figure 6:
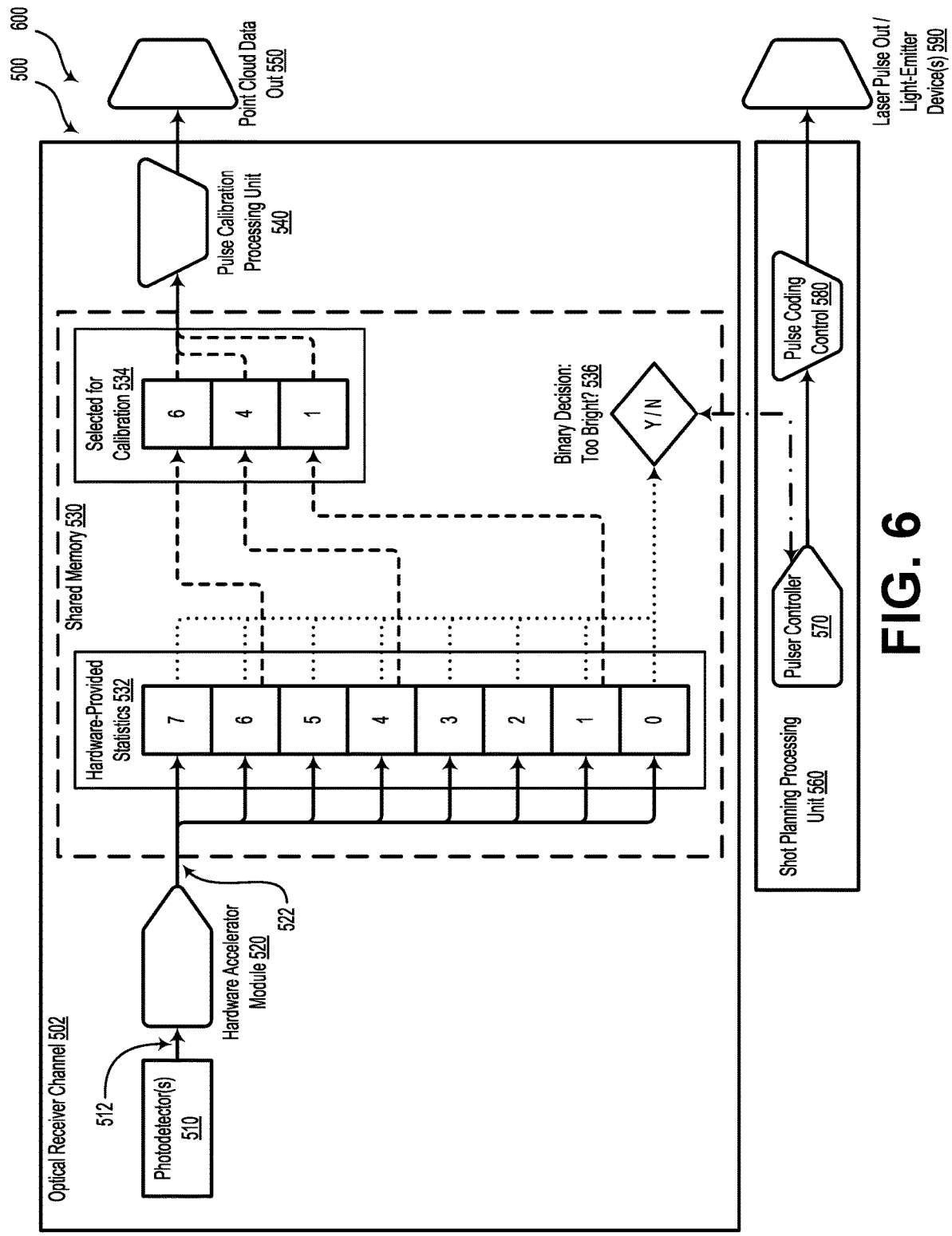
FIG. 6 is a data flow diagram of the optical receiver illustrated in FIG. 5, according to example embodiments.

FIG. 5 is a block diagram of an optical receiver 500, according to example embodiments. The optical receiver 500 could be similar or identical to portions of lidar system 128 as illustrated and described in relation to FIG. 1 and/or lidar device 410 as illustrated and described in relation to FIGS. 4A and 4B. FIG. 6 is a data flow diagram 600 of the optical receiver 500 illustrated in FIG. 5, according to example embodiments. The following description applies to FIGS. 5 and 6.

The optical receiver 500 includes a plurality of photodetectors 510. The photodetectors 510 could include photosensitive devices capable of detecting single photons (e.g., single photon avalanche diodes or SPADs, etc.). Further, the photodetectors may be arranged (e.g., through an electrical connection in series, etc.) into an array (e.g., as in a silicon photomultiplier or SiPM, etc.). Optionally, the photodetectors 510 could include CMOS photodetectors or TFT photodetectors. It will be understood that other types of photodetectors are possible and contemplated.

The optical receiver 500 also includes a shared memory 520. The shared memory 520 could include, for example, a processor register, static random access memory (RAM), dynamic RAM, read-only memory (ROM), programmable read-only memory (PROM), erasable programmable read-only memory (EPROM) and/or electronically erasable programmable read-only memory (EEPROM) memory. The shared memory 520 could be configured to store statistics and other information about light pulses that are received by the photodetectors 510.

The optical receiver 500 additionally includes a pulse calibration processing unit 540 that is communicatively coupled to the shared memory 520. The pulse calibration processing unit could include a CPU configured to analyze the light pulse statistics stored in the shared memory 520. Additionally or alternatively, the pulse calibration processing unit could include one or more graphics processing units (GPUs), tensor processing units (TPUs), digital signal processors (DSPs), field-programmable gate arrays (FPGAs), and/or application-specific integrated circuits (ASICs).

The optical receiver 500 also includes a hardware accelerator module 520. The hardware accelerator module 520 could be configured to perform specific computing tasks by utilizing specialized hardware components. Using the specialized hardware components can provide a more time and/or resource efficient way to complete computing tasks in comparison to using a generic CPU. The hardware accelerator module 520 could include one or more GPUs, DSPs, FPGAs, and/or ASICs. It will be understood that other types of computing hardware and/or circuits are contemplated and possible within the scope of this disclosure.

The hardware accelerator module 520 is configured to, during an initial phase, accept input waveforms 512 from the plurality of photodetectors 510. During the initial phase, the hardware accelerator module 520 may also compare an amplitude of the respective input waveforms 512 with a predetermined threshold 522. The predetermined threshold 522 could include a number that represents an intensity value, a current value, and/or a voltage value equivalent to when a light pulse may be considered to be a very bright light pulse. The predetermined threshold 522 could be based on an integral of the light pulse and a width of the light pulse. As an example, the predetermined threshold 522 could be equal to a quotient of the integral of the light pulse and the width of the light pulse such that a very bright light pulse could be classified as a bright light pulse. A bright light pulse could be reflected by a retroreflector. In such scenarios, the retroreflector may be an object in the environment that reflects light with minimal scattering or attenuation.

During the initial phase, the hardware accelerator module 520 may also, based on the comparison, determine subsets 524 of the input waveforms 512. In an example embodiment, the subsets 524 of the input waveforms 512 could include a pulse peak (e.g., an amplitude maximum, etc.) and temporally-adjacent regions of the waveforms. In some examples, the subsets 524 could include segments of the pulse waveforms corresponding to the full-width half-maximum (FWHM) regions of a given light pulse. In other examples, the subsets 524 could include segments of the pulse waveforms that correspond to values above 10% of the maximum amplitude of each light pulse.

The hardware accelerator module 520 could also, during a subsequent phase, determine information indicative of characteristic aspects 526 of the subsets 524 of the input waveforms 512. In some examples, the characteristic aspects 526 include at least one of: a pulse integral, a pulse width, a maximum amplitude, a number of extrema (e.g., waveform maximum or waveform minimum), or a location of extrema. It will be understood that other types of characteristic aspects of the input waveforms 512 are contemplated and possible.

The hardware accelerator module 520 could also, during the subsequent phase, store the determined information in the shared memory 530. In some examples, storing the determined information in the shared memory 530 could include performing a direct memory access (DMA) procedure to store the determined information in the shared memory 530. In other words, the characteristic aspects 526 of the subsets 524 of the input waveforms 512 (e.g., pulse maximum, pulse width, pulse integral, etc.) could be directly stored in the shared memory 530.

In some examples, specific pulses and their corresponding characteristics could be selected for calibration 534. As described herein, the pulse calibration processing unit 540 could be configured to carry out processing on the selected pulse information. However, it will be understood that the pulse calibration processing unit 540 could be configured to optionally process any or all of the hardware-provided statistics 532 from the hardware accelerator module 520.

The hardware accelerator module 520 could also, during the subsequent phase, trigger an interrupt for the pulse calibration processing unit 540 to initiate a pulse calibration process on the determined information.

In some embodiments, the optical receiver 500 may be configured in a plurality of optical channels associated with an application-specific integrated circuit (ASIC) 502 and a shot planning processing unit 560. In such scenarios, each optical channel could be associated with one hardware accelerator (e.g., one channel of hardware accelerator module 520, etc.) and one pulse calibration processing unit (e.g., pulse calibration processing unit 540, etc.).

In some examples, the shot planning processing unit 560 could be configured to analyze the characteristic aspects 526 of the subsets 524 of the input waveforms 512. The shot planning processing unit 560 may also be configured to send the characteristic aspects 526 of the subsets 524 of the input waveforms 512 to a binary classifier configured to determine whether the input waveforms 512 are excessively bright.

In various example embodiments, the shot planning processing unit 560 is configured to, in response to an indication that the input waveforms 512 are excessively bright, initiate a crosstalk mitigation process in the respective optical channels. The crosstalk mitigation process could mitigate the negative effects of receiving excessively bright light pulses due to retroreflectors in the environment of the lidar. In such scenarios, light-emitter devices that are associated with the bright returns could be switched off for at least some period of time or on the next light pulse.

The crosstalk mitigation process could be performed by a pulser controller 570 and/or a pulse coding controller 580. The crosstalk mitigation process could include turning off at least one light-emitter device 590 associated with the respective optical channels. Furthermore, in some examples, the crosstalk mitigation process could include subsequently turning on at least one light-emitter device 590 after at least one of: a predetermined elapsed time or a lack of crosstalk returns in the respective optical channel.

In example embodiments, the various elements of optical receiver 500 could be communicatively coupled by way of a communication interface 504. Communication interface 504 could include a wired or wireless means of conveying information or signals between elements of the optical receiver 500. The information and signals could include analog and/or digital signals that may be conveyed in various formats, including by way of time-varying electrical and/or optical signals.

In some embodiments, at least a portion of the conveyed information could be formatted according to a high speed data protocol. For example, the high speed data protocol could include the MIPI Camera Serial Interface 2 (MIPI CSI-2). Other streaming data protocols are possible and contemplated.

In some examples, the hardware acceleration module 520, pulse calibration processing unit 540, and/or the shot planning processing unit 560 could share a common clock 531. In such scenarios, the common clock 531 could include one or more phase-locked loops (PLLs) and/or an off-chip main clock source. In some embodiments, the clock signal could have a frequency in the GHz range (e.g., 1 GHz, 2.5 GHz, 5 GHz, etc.). Other clock frequencies and/or types of clocks or timing triggers are possible and contemplated.

FIG. 6 illustrates an example embodiment including a single optical receiver channel 502 with its paired hardware accelerator 520. In this scenario, the hardware accelerator is configured to provide the pulse calibration processing unit 540 with summary statistics for eight calibrated returns in shared memory. The pulse calibration processing unit 540 indicates at a fixed memory location (e.g., memory location 536, etc.) whether any of the pulses were too bright. In such an example, the shot planning processing unit 560 could monitor memory location 536. The shot planning processing unit 560 could monitor the memory location 536 based on a periodic schedule, a continuous schedule, or in response to an interrupt condition. The shot planning processing unit 560 uses the information it aggregates from multiple channels to adjust a laser firing pattern for the channels by way of providing an adjusted laser pulse out for the light-emitter devices 590. Separately, the pulse calibration processing unit 540 may calibrate three returns (e.g., returns corresponding to channels 6, 4, and 1, etc.) and may publish the resulting points to client devices and/or software as point cloud data out 550 for incorporation into a point cloud.

Figure 7A:
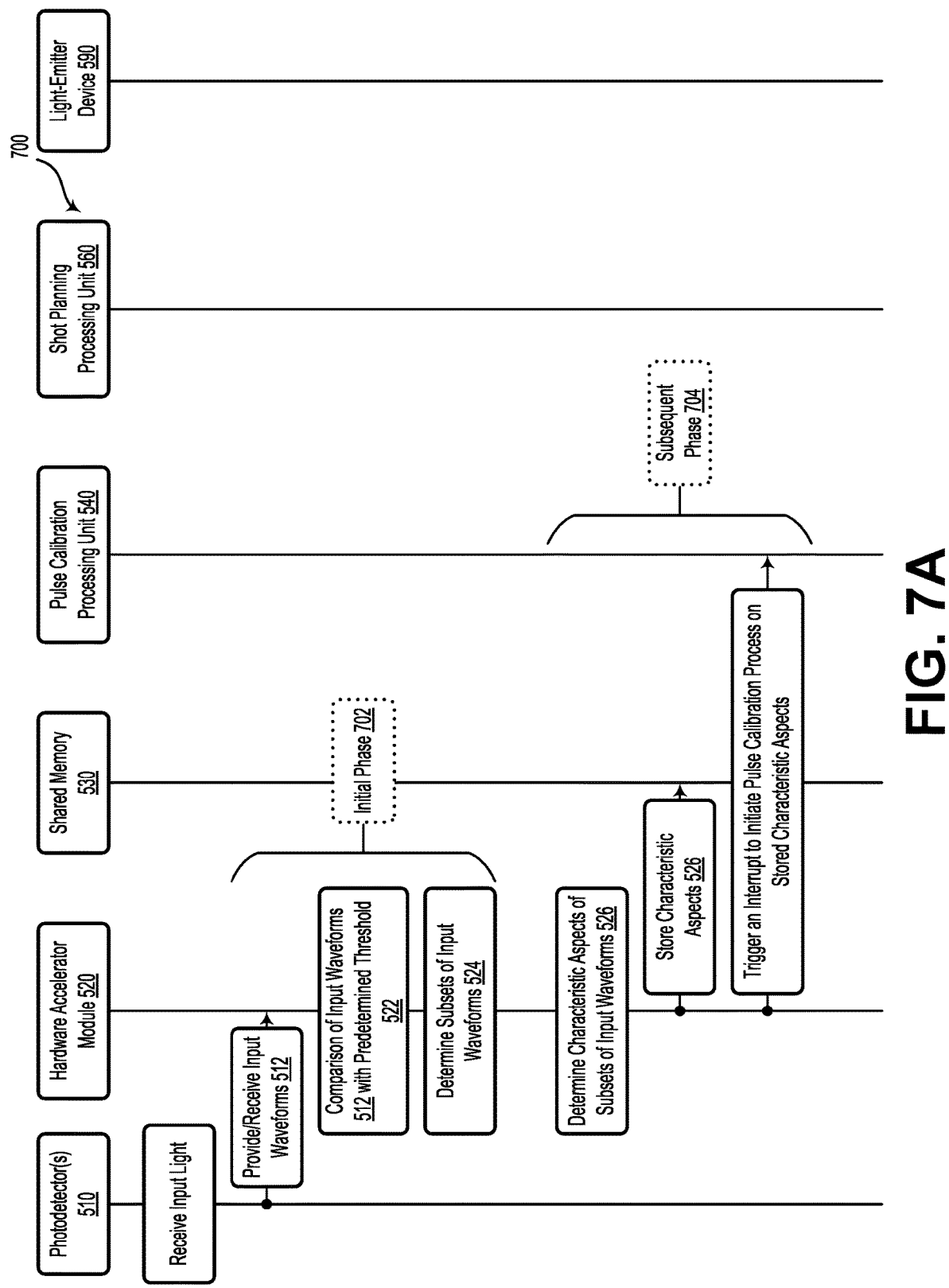
FIG. 7A is a swimlane diagram, according to example embodiments.
Figure 7B:
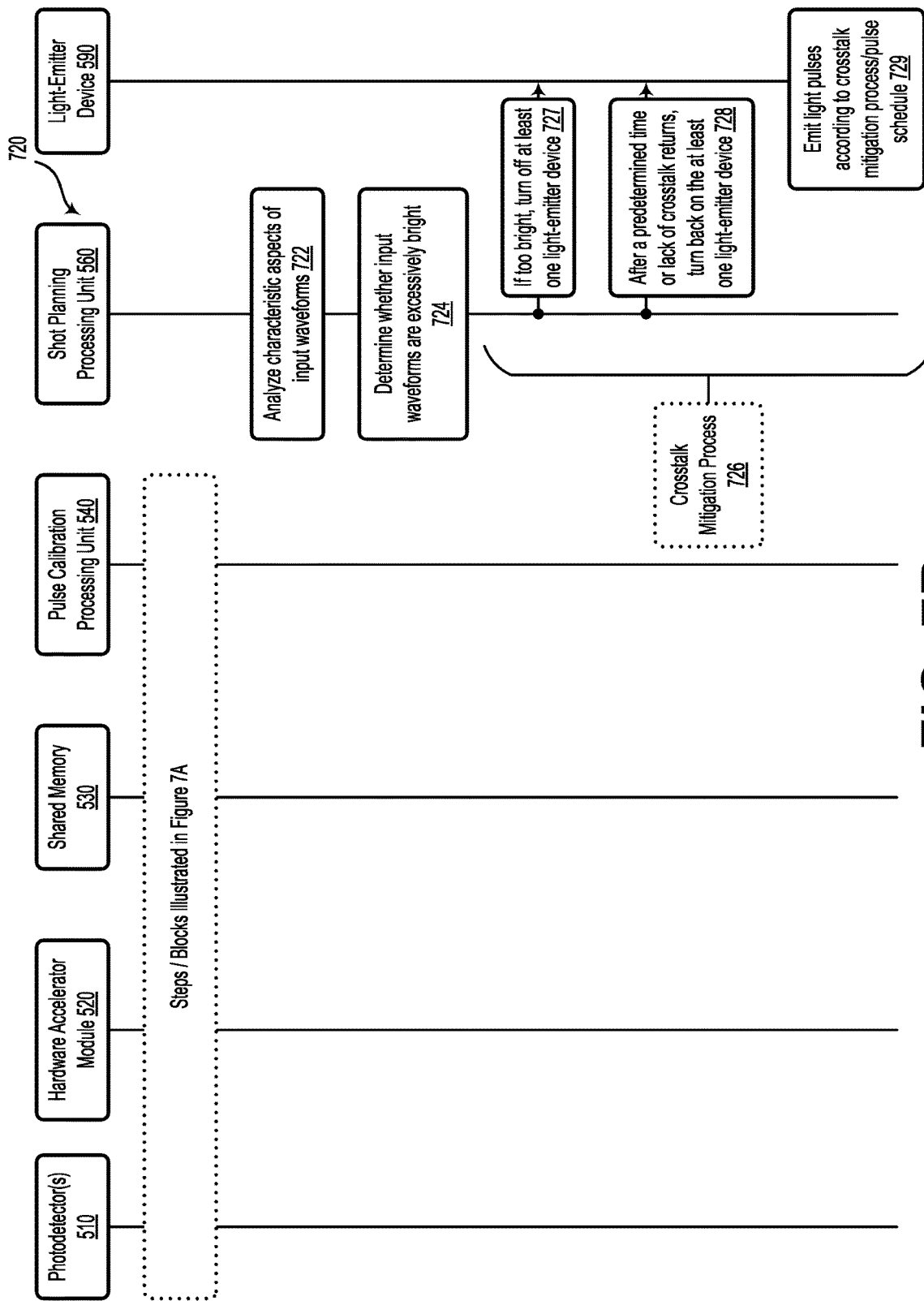
FIG. 7B is a swimlane diagram, according to example embodiments.

FIGS. 7A and 7B are swimlane diagrams 700 and 720, according to example embodiments. Swimlane diagrams 700 and 720 schematically describe the interactions between various elements of the optical receiver 500. For example, swimlane diagrams 700 and 720 illustrate the temporal flow and processing of information among the photodetectors 510, hardware accelerator module 520, shared memory 530, pulse calibration processing unit 540, shot planning processing unit 560, and light emitter device 590.

Figure 8:
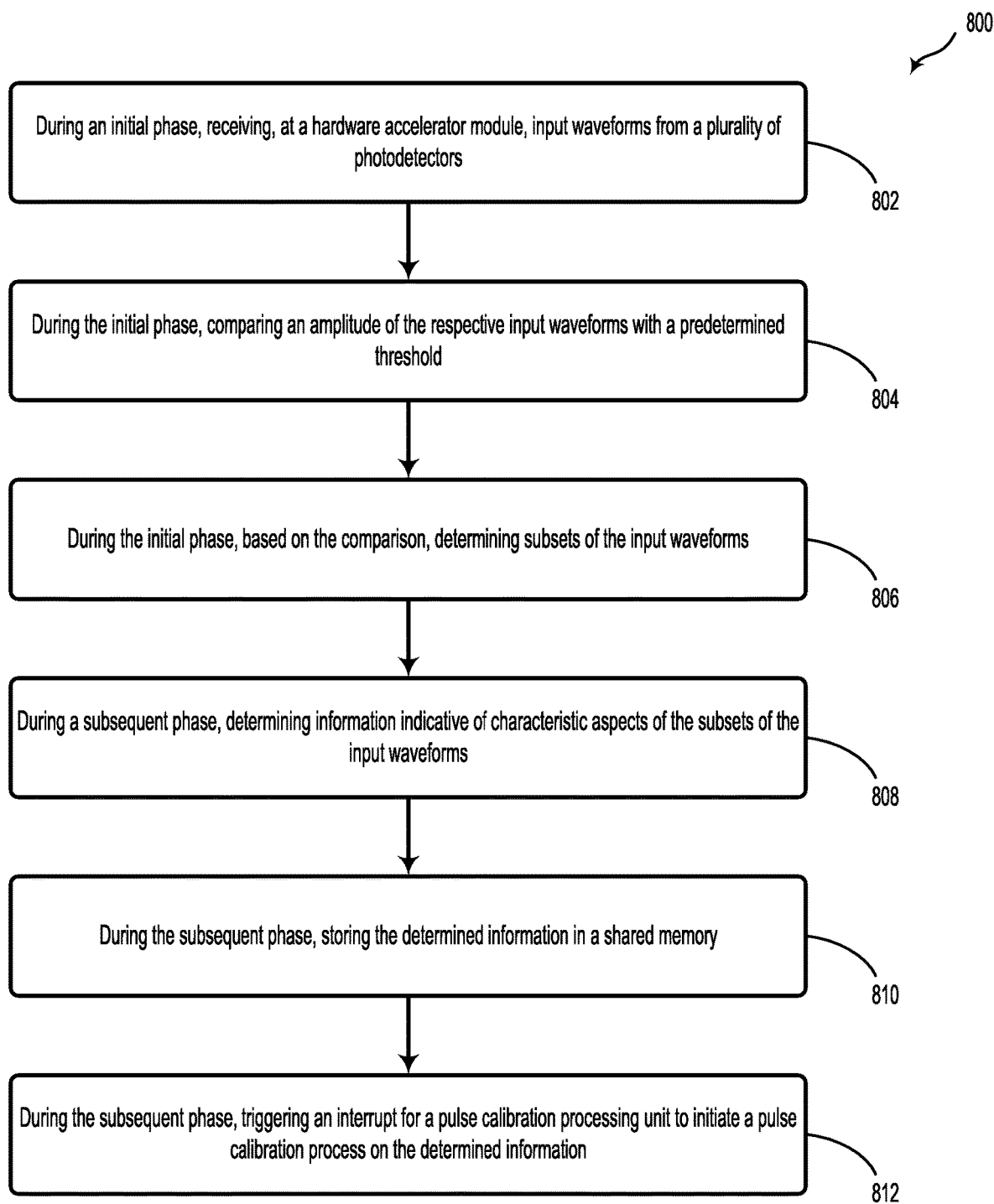
FIG. 8 is a flow chart depicting a method, according to example embodiments.

FIG. 8 is a flow chart depicting a method 800, according to example embodiments. The method 800 will be described within the context of FIGS. 7A and 7B. While method 800 illustrates several blocks of a method, it will be understood that fewer or more blocks or steps could be included. In such scenarios, at least some of the various blocks or steps may be carried out in a different order than of that presented herein. Furthermore, blocks or steps may be added, subtracted, transposed, and/or repeated. Some or all of the blocks or steps of method 800 may be carried out so as to operate the lidar 128, lidar device 410, or optical receiver 500, as illustrated and described in reference to FIG. 1, FIGS. 4A and 4B, and FIG. 5, respectively. In some examples, method 800 and its blocks could be performed/processed according to signals from the common clock 531. In such scenarios, various blocks and/or operations of method 800 could be synchronized based on the common clock 531.

As illustrated in FIG. 7A, photodetectors 510 initially receive input light from an environment of the lidar system. The photodetectors 510 may convert the input light into a photosignal, which could have a corresponding input waveform 512 (e.g., an electrical signal, etc.). In an example embodiment, the input waveform could include information indicative of a brightness or amplitude of a return light pulse.

Block 802 includes, during an initial phase (e.g., initial phase 702 as illustrated in FIG. 7A, etc.), receiving, at a hardware accelerator module (e.g., hardware accelerator module 520, etc.), the input waveforms (e.g., input waveforms 512, etc.) from a plurality of photodetectors (e.g., photodetectors 510, etc.). In such scenarios, the photodetectors could provide the input waveforms to the hardware accelerator module by way of a communication interface (e.g., communication interface 504, etc.).

Block 804 includes, during the initial phase, comparing an amplitude of the respective input waveforms with a predetermined threshold (e.g., predetermined threshold 522, etc.). In some examples, the hardware accelerator module could perform the comparison function by way of a comparator circuit configured to compare two voltages or currents and which may output a digital signal based on the larger of the two voltages or currents.

Block 806 includes, based on the comparison, determining subsets (e.g., subsets 524, etc.) of the input waveforms. In such a scenario, the hardware accelerator module could perform the determination of the subsets.

Block 808 includes during a subsequent phase (e.g., subsequent phase 704, etc.), determining information indicative of characteristic aspects (e.g., characteristic aspects 526, etc.) of the subsets of the input waveforms. In example embodiments, the characteristic aspects could include at least one of: a pulse integral, a pulse width, a maximum amplitude, a number of extrema, or a location of extrema. In some examples, extrema could include local maxima or minima of the input waveforms.

Block 810 includes, during the subsequent phase, storing the determined information in a shared memory (e.g., shared memory 530, etc.). In an example embodiment, storing the determined information in the shared memory could include performing a direct memory access procedure to store the determined information in the shared memory.

Block 812 includes, during the subsequent phase, triggering an interrupt for a pulse calibration processing unit (e.g., pulse calibration processing unit 540, etc.) to initiate a pulse calibration process on the determined information.

In some example embodiments, method 800 could include analyzing 722, at a shot planning processing unit (e.g., shot planning processing unit 860, etc.), the characteristic aspects of the subsets of the input waveforms. In such scenarios, method 800 may additionally include sending the characteristic aspects of the subsets of the input waveforms to a binary classifier configured to determine whether the input waveforms are excessively bright. Such a determination 724 could include whether input waveforms are excessively bright.

Additionally, in response to an indication that the input waveforms are excessively bright, method 800 could include initiating a crosstalk mitigation process in respective optical channels. In such scenarios, the crosstalk mitigation process includes turning off 727 at least one light-emitter device associated with the respective optical channels. The crosstalk mitigation process further includes subsequently turning on 728 at least one light-emitter device after at least one of: a predetermined elapsed time or a lack of crosstalk returns in the respective optical channel. Put another way, based on the received input waveforms, the crosstalk mitigation process 726 could dynamically adjust a light pulse schedule to reduce the possibility of excessively bright returns in subsequent time periods. Subsequently, the light-emitter device 590 could emit light pulses 729 based on a crosstalk mitigation process and/or the adjusted light pulse schedule.

Operable aspects of the optical receivers and the corresponding methods described herein could be carried out and/or executed by way of a non-transitory computer-readable medium having encoded thereon instructions executable to carry out operations. In an example embodiment, a non-transitory computer-readable medium could be configured to carry out operations comprising, during an initial phase, receiving, at a hardware accelerator module, input waveforms from a plurality of photodetectors. The operations may additionally include, during the initial phase, comparing an amplitude of the respective input waveforms with a predetermined threshold. The operations may also include, during the initial phase, based on the comparison, determining subsets of the input waveforms. The operations also include, during a subsequent phase, determining information indicative of characteristic aspects of the subsets of the input waveforms. The operations additionally include storing the determined information in a shared memory and triggering an interrupt for a pulse calibration processing unit to initiate a pulse calibration process on the determined information.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An optical receiver comprising:
    a plurality of photodetectors;
    a shared memory;
    a pulse calibration processing unit communicatively coupled to the shared memory; and
    a hardware accelerator module configured to:
      during an initial phase:
        accept input waveforms from the plurality of photodetectors;
        compare an amplitude of the respective input waveforms with a predetermined threshold; and
        based on the comparison, determine subsets of the input waveforms; and
      during a subsequent phase:
        determine information indicative of characteristic aspects of the subsets of the input waveforms;
        store the determined information in the shared memory; and
        trigger an interrupt for the pulse calibration processing unit to initiate a pulse calibration process on the determined information.

2. The optical receiver of claim 1, wherein the characteristic aspects comprise at least one of:
    a pulse integral, a pulse width, a maximum amplitude, a number of extrema, or a location of extrema.

3. The optical receiver of claim 1, wherein storing the determined information in the shared memory comprises performing a direct memory access procedure to store the determined information in the shared memory.

4. The optical receiver of claim 1, further comprising:
    a plurality of optical channels associated with an application-specific integrated circuit (ASIC) and a shot planning processing unit, wherein each optical channel is associated with:
      a hardware accelerator; and
      a pulse calibration processing unit.

5. The optical receiver of claim 4, wherein the shot planning processing unit is configured to:
    analyze the characteristic aspects of the subsets of the input waveforms; and
    send the characteristic aspects of the subsets of the input waveforms to a binary classifier configured to determine whether the input waveforms are excessively bright.

6. The optical receiver of claim 5, wherein the shot planning processing unit is configured to:
    in response to an indication that the input waveforms are excessively bright, initiate a crosstalk mitigation process in the respective optical channels.

7. The optical receiver of claim 6, wherein the crosstalk mitigation process comprises turning off at least one light-emitter device associated with the respective optical channels.

8. The optical receiver of claim 7, wherein the crosstalk mitigation process comprises subsequently turning on at least one light-emitter device after at least one of: a predetermined elapsed time or a lack of crosstalk returns in the respective optical channel.

9. A method comprising:
    during an initial phase:
      receiving, at a hardware accelerator module, input waveforms from a plurality of photodetectors;
      comparing an amplitude of the respective input waveforms with a predetermined threshold; and
      based on the comparison, determining subsets of the input waveforms; and
    during a subsequent phase:
      determining information indicative of characteristic aspects of the subsets of the input waveforms;
      storing the determined information in a shared memory; and
      triggering an interrupt for a pulse calibration processing unit to initiate a pulse calibration process on the determined information.

10. The method of claim 9, wherein the characteristic aspects comprise at least one of: a pulse integral, a pulse width, a maximum amplitude, a number of extrema, or a location of extrema.

11. The method of claim 9, wherein storing the determined information in the shared memory comprises performing a direct memory access procedure to store the determined information in the shared memory.

12. The method of claim 9, further comprising:
    analyzing, at a shot planning processing unit, the characteristic aspects of the subsets of the input waveforms; and
    sending the characteristic aspects of the subsets of the input waveforms to a binary classifier configured to determine whether the input waveforms are excessively bright.

13. The method of claim 12, further comprising:
in response to an indication that the input waveforms are excessively bright, initiating a crosstalk mitigation process in respective optical channels.

14. The method of claim 13, wherein the crosstalk mitigation process comprises turning off at least one light-emitter device associated with the respective optical channels.

15. The method of claim 14, wherein the crosstalk mitigation process further comprises subsequently turning on at least one light-emitter device after at least one of: a predetermined elapsed time or a lack of crosstalk returns in the respective optical channel.

16. A non-transitory computer-readable medium having encoded thereon instructions executable to carry out operations, the operations comprising:
during an initial phase:
receiving, at a hardware accelerator module, input waveforms from a plurality of photodetectors;
comparing an amplitude of the respective input waveforms with a predetermined threshold; and
based on the comparison, determining subsets of the input waveforms; and
during a subsequent phase:
determining information indicative of characteristic aspects of the subsets of the input waveforms;
storing the determined information in a shared memory; and
triggering an interrupt for a pulse calibration processing unit to initiate a pulse calibration process on the determined information.

17. The non-transitory computer-readable medium of claim 16, wherein the characteristic aspects comprise at least one of: a pulse integral, a pulse width, a maximum amplitude, a number of extrema, or a location of extrema.

18. The non-transitory computer-readable medium of claim 16, wherein storing the determined information in the shared memory comprises performing a direct memory access procedure to store the determined information in the shared memory.

19. The non-transitory computer-readable medium of claim 16, further comprising:
analyzing, at a shot planning processing unit, the characteristic aspects of the subsets of the input waveforms; and
sending the characteristic aspects of the subsets of the input waveforms to a binary classifier configured to determine whether the input waveforms are excessively bright.

20. The non-transitory computer-readable medium of claim 19, further comprising:
in response to an indication that the input waveforms are excessively bright, initiating a crosstalk mitigation process in respective optical channels.

* * * * *